Patented Sept. 15, 1936

2,054,299

UNITED STATES PATENT OFFICE 2,054,299

HYDROXY CELLULOSE ETHER SOLUTIONS

George A. Richter, Berlin, N. H., assignor to Brown Company, Berlin, N. H., a corporation of Maine No Drawing. Application May 31, 1934, Serial No. 728,301

5 Claims. (Cl. 106—40)

This invention relates to the preparation of hydroxy cellulose ether solutions such as are used in making artificial silk filaments, transparent films, and other ultimate products. Solutions of this kind are prepared by dissolving the solid hydroxy cellulose ether in caustic soda solution. In producing the ultimate product, the ether solution is brought in contact with suitable acidic media, such as a sulphuric acid solution of sodium sulphate, which function to precipitate or regenerate the ether in solid condition from the solution. Thus, the ether solution may be extruded through spinnerets into acid-setting baths which serve to regenerate the ether in the form of filaments or threads. In making filaments, transparent films, or similar manufactures, it is necessary that the ether solution be sufficiently fluent to lend itself to the desired extruding, spreading, or similar operation and that such fluency exist when the solution contains sufficient ether dissolved therein to yield upon setting or precipitation an ultimate manufacture possessed of sufficient body or ether substance. This means, of course, that the ether solution must be stable in the sense that it will not gel or coagulate before it is put through the spinning, spreading, or similar operation.

In working with hydroxy cellulose ether solutions, I have observed that they are apt to vary greatly in stability, depending upon such factors as the kind of cellulose employed as raw material, the amount of etherifying agent with which etherification is effected, the conditions of etherification, and the after-treatment which the ether undergoes preparatory to being dissolved in caustic soda solution. I have further observed that the stability of the cellulose ether solution affords no criterion of the quality of the filaments, films, or other products derived from such solution. Indeed, I have found that the filaments and films produced from ether solutions of low stability often possess distinctly greater wet strength than those produced from solutions of high stability. This is possibly attributable to the fact that the cellulose ether regenerated from a solution of high stability has a greater tendency to reassume a dissolved state when wetted with water. High stability is also frequently associated with very fluid solutions that are made from ethers which, in turn, are produced from highly depolymerized cellulose.

In accordance with the present invention, I prepare a solution of hydroxy cellulose ether that represents a blend of an ether of high solution stability and an ether of low solution stability, for I have discovered that such a solution partakes of the stability quality of the ether of high solution stability but yields filaments, films, and similar products of higher wet strength than those obtainable from a solution of the ether of high solution stability alone. Thus, by preparing a solution of hydroxy cellulose ether that represents a blend of approximately equal proportions of an ether of high solution stability, for instance, an ether displaying practically no gelling or coagulating tendencies in solution even after the solution has been allowed to stand for days, and an ether of low solution stability, for instance, an ether displaying decided gelling or coagulating tendencies in solution immediately or after the solution has been allowed to stand only for a few hours, I have found it possible practically to do away with the instability of the ether of low solution stability, for the solution representing such a blend can stand for days without gelling or coagulating, partaking of the stability of a solution of the ether of high solution stability alone. In other words, the solution representing such a blend does not possess, as might be expected, a stability constituting an average or arithmetic mean of the stability values of the component ethers, but acquires a vastly greater stability. Apparently, the effect of the ether of high solution stability is that of a peptizing or stabilizing agent, acting to peptize or stabilize to a decided degree the solution of ether of low solution stability without, however, itself being materially impaired in its solution stability. The net result is, as already indicated, a stable ether solution whose component of low solution stability imparts higher wet strength to the ultimate product derived from the solution.

Another important advantage to be gained by my invention is that I am enabled to prepare a solution representing a blend of ethers such as hereinbefore described at a lower expense than a solution containing only ether of high solution stability. The fact is that whereas hydroxy cellulose ethers of high solution stability are usually realized only when special treatment is performed on the cellulose fiber used as raw material and/or on the resulting ether and/or when etherification is carried out under special conditions, no such special treatment or special conditions of etherification are necessary in arriving at ethers of low solution stability. Thus, ethers of high solution stability may be prepared to advantage from cellulose fiber that has undergone a mercerizing and/or other chemical treatment that lowers the solution viscosity of the fiber. They may be produced by hydrolyzing ethers of comparatively high solution viscosity under heat and pressure in dilute solutions of mineral acids, such as hydrochloric and sulphuric acid, which act to reduce greatly the solution viscosity of such ethers. They may result also from the use of a comparatively large amount of etherifying agent in their etherification. None of the foregoing expedients and the concomitant expense are, however, necessary in the case of ethers of low solution stability. In accordance with the present invention, therefore, it becomes advantageous to prepare a solution of hydroxy cellulose ether that represents a blend of ethers produced from both mercerized and unmercerized cellulose fiber; a blend of ethers produced from both cellulose fiber of high solution viscosity and cellulose fiber of low solution viscosity; and a blend of ether of high solution viscosity and an ether of low solution viscosity. Indeed, it becomes advantageous to prepare a solution of hydroxy cellulose ether that represents a blend of ethers whose cellulose base originates from such mixed sources as cotton, softwood, hardwood, etc., since fibers or pulps of such different origins may yield hydroxy cellulose ethers of widely varying solution stability.

In arriving at the hydroxy cellulose ether solution of the present invention, various practices may be adopted. For instance, I may blend two or more cellulose fibers of different characteristics, etherify the blend, and then dissolve the resulting product in caustic soda solution to produce a stable ether solution. Thus, a blend of unmercerized and mercerized cellulose fibers may be etherified and then dissolved in caustic soda solution. If desired, each kind of fiber may be etherified independently and the resulting ethers blended preparatory to being dissolved in caustic soda solution. Or the same kind of fiber may be etherified in different batches with different proportions of etherifying agent to produce ethers differing sharply in their solution stability, whereupon the ethers may be blended and dissolved in caustic soda solution. Where the blending takes place before etherification or after etherification, it is preferably done before the step of dissolving the ethers. In other words, I prefer not to dissolve each of the ethers independently and then mix the resulting solutions of different stabilities, but to blend the solid ethers preparatory to putting them into solution. In any event, however, the caustic soda solution in which an ether or blend of ethers is to be dissolved is preferably first frozen in admixture with the ether or ethers and then thawed out under vigorous mixing or kneading action, as this tends to activate the ether or blend of ethers for complete solution, that is, with a minimum of residual undissolved matter that detracts from the clarity of the solution.

A specific example of procedure accordant with my invention may be substantially as follows. Mercerized cellulose of low solution viscosity is etherified with ethylene oxide in the amount of about 15% or more, based on the weight of the cellulose, to produce a hydroxy ethyl ether of cellulose which, after activation, goes readily into solution and yields a highly stable ether solution, namely, one that does not tend to gel or coagulate even after a week or more of standing. Unmercerized cellulose of high solution viscosity is etherified with, say, only about 6% of ethylene oxide, based on the weight of cellulose, to produce a hydroxy ethyl ether of cellulose, which even after activation, does not go into solution readily and yields a highly unstable ether solution, namely, one that tends to gel or coagulate immediately or after standing only for a few hours or a shorter period of time. When such ethers are blended in the proportion of, say, 50% each, and the blend is activated for solution by mixing with the caustic soda solution in which solution is to be effected, freezing the solution, and thawing out the solution under vigorous stirring or kneading action, the blend dissolves nicely to form an ether solution of good stability, namely, a stability vastly greater than that of a solution produced from only the ether of low solution stability. Indeed, the solution of the blend has a stability that approximates that of a solution produced from only the ether of high solution stability, remaining stable even after a week or more of standing. Besides imparting high stability to the solution of the blend, the ether component of high solution stability reduces greatly the viscosity of the solution of the blend. It is desirable that the solution produced from the blend contain dissolved therein about 7% of caustic soda and about 8% of cellulose ether, as such a solution not only possesses the desired stability, but also the workable fluidity and cellulose ether concentration for making such products as filaments and films. Such a solution may also be used in impregnating paper, felts, or woven fabrics, in which latter connection, however, it may, if desired, be readily diluted with water to any desired concentration.

The present invention includes blends of more than two hydroxy cellulose ethers of different stabilities dissolved stably in caustic soda solution, such blends comprising an ether of high solution stability and an ether of low solution stability, for instance, a hydroxy ethyl ether of high ethyl content and a hydroxy ethyl ether of low ethyl content, as hereinbefore described. In any blend prepared in accordance with my invention, the ether of high solution stability has a solution stability sufficiently high and is present in sufficient amount to preserve the solution of the blend against gelling or coagulating after standing for at least a few days, even though a solution of only the ether of low solution stability gels or coagulates upon standing for only a few hours or even a shorter period of time.

It is often the case that a cellulose ether having low solution stability will gel as it is being put into solution without first producing a fluent solution. Such degree of instability is apt to exist in the case of ethers produced from unmercerized cellulose or from mercerized cellulose of low solution viscosity. For instance, when hydroxy cellulose ethers so produced are admixed with caustic soda solution, the solution then frozen, and the mixture mascerated while it is being thawed out, the resulting solution is often a clear, substantially fiberless, rubber-like gel. In other words, the resulting solution is unworkable into filaments, films, or other manufactures by any of the usual processes. In other instances, the resulting solution is clear and fluent but tends to gel in from 1 to 24 hours. I have observed that gelling of such solution may be delayed by keeping it at low temperature, say, at about 10° C. For instance, it is sometimes the case that a solution remains fluent at such temperature for about 6 to 8 hours, but gels rapidly at room temperature. On the other hand, a hydroxy cellulose ether of high solution stability such as enter into the compositions of the present invention may be dissolved in caustic soda solution to form a solution which retains its fluent state for 8 to 10 days even though it is kept at above usual room temperature, say, 30° to 35° C., during this period. As already indicated, I prefer not to dissolve the ether of low solution stability independently of the ether of high solution stability with which blending is to be effected, but to blend the two ethers preparatory to putting them both into solution, thereby avoiding the production of a gelled solution of the ether of low solution stability.

I claim:—

1. A process of stabilizing a caustic soda solution of hydroxy cellulose ether tending to gel after standing at most for a few hours, which comprises dissolving in such solution substantially at the time of its preparation a substantial amount of another hydroxy cellulose ether tending by itself to remain ungelled in solution for a markedly longer period of time so as to impart to the solution of mixed ethers a stability against gelling much greater than the arithmetic mean of the stabilities against gelling of both said ethers, thereby greatly increasing the solution stability of said first-named ether of low solution stability.

2. A process of stabilizing a caustic soda solution of hydroxy cellulose ether tending to gel after standing at most for a few hours, which comprises dissolving in such solution substantially at the time of its preparation a substantial amount of another hydroxy cellulose ether tending by itself to remain ungelled in solution for at least a few days so as to impart to the solution of mixed ethers a stability against gelling much greater than the arithmetic mean of the stabilities against gelling of both said ethers, thereby greatly increasing the solution stability of said first-named ether of low solution stability.

3. A process of stabilizing a caustic soda solution of hydroxy cellulose ether tending to gel after standing at most for a few hours, which comprises dissolving in such solution substantially at the time of its preparation a substantial amount of another hydroxy cellulose ether tending by itself to remain ungelled in solution for at least a few days so as to impart to the solution of mixed ethers a stability against gelling much greater than the arithmetic mean of the stabilities against gelling of both said ethers, said second-named ether of high solution stability being dissolved in amount sufficient to preserve the solution of mixed ethers against gelling for at least a few days.

4. A process of stabilizing a caustic soda solution of hydroxy ethyl ether of cellulose tending to gel after standing at most for a few hours, which comprises dissolving in such solution substantially at the time of its preparation a substantial amount of another hydroxy ethyl ether of cellulose of higher ethyl content tending by itself to remain ungelled in solution for a markedly longer period of time so as to impart to the solution of mixed ethers a stability against gelling much greater than the arithmetic mean of the stability against gelling of both said ethers, thereby greatly increasing the solution stability of said first-named ether of lower ethyl content and lower solution stability.

5. A process of stabilizing a caustic soda solution of hydroxy ethyl ether of an unmercerized cellulose tending to gel after standing at most for a few hours, which comprises dissolving in such solution substantially at the time of its preparation a substantial amount of another hydroxy ethyl ether of a mercerized cellulose tending by itself to remain in ungelled solution for a markedly longer period of time so as to impart to the solution of mixed ethers a stability against gelling much greater than the arithmetic mean of the stability against gelling of both said ethers, thereby greatly increasing the solution stability of said first-named ether of unmercerized cellulose and low solution stability.

GEORGE A. RICHTER.